United States Patent [19]
Wiman et al.

[11] Patent Number: 5,743,681
[45] Date of Patent: Apr. 28, 1998

[54] CUTTING INSERT WITH CHIP CONTROL PROTRUSION ON A CHIP SURFACE

[75] Inventors: Jörgen Wiman, Sandviken; Sture Murén, Gävle; Jan-Olof Olsson, Kungsgården; Robert Isaksson, Järbo, all of Sweden

[73] Assignee: Sandvik AB, Sandviken, Sweden

[21] Appl. No.: 837,092

[22] Filed: Apr. 14, 1997

Related U.S. Application Data

[63] Continuation of Ser. No. 539,374, Oct. 5, 1995, abandoned and a continuation of PCT/SE94/00290, Mar. 30, 1994.

[51] Int. Cl.⁶ ............................................. B23B 27/22
[52] U.S. Cl. ............................................. 407/114; 407/116
[58] Field of Search ........................... 407/114–116

[56] References Cited

U.S. PATENT DOCUMENTS

| | | | |
|---|---|---|---|
| 4,988,242 | 1/1991 | Pettersson et al. | 407/114 |
| 5,044,840 | 9/1991 | Fouquer et al. | 407/114 |
| 5,116,167 | 5/1992 | Niebauer | 407/114 |
| 5,147,159 | 9/1992 | Lowe et al. | 407/114 |
| 5,372,463 | 12/1994 | Takahashi et al. | 407/114 |

FOREIGN PATENT DOCUMENTS 2-109612   4/1990   Japan.

*Primary Examiner*—Steven C. Bishop
*Attorney, Agent, or Firm*—Burns, Doane, Swecker & Mathis, L.L.P.

[57] ABSTRACT

An indexable cutting insert for metal machining, in particular turning, is formed with banana- or C-shaped protrusions (11) adjacent to each operative cutting corner. The concave side of the protrusion faces in a direction towards the cutting corner. In comparison with corresponding inserts without such a protrusion a better chip control is achieved. Thus, the chip flow is led away from the machined surface both at small and large cutting depths and the chips are broken into suitable lengths.

2 Claims, 3 Drawing Sheets

CUTTING INSERT WITH CHIP CONTROL PROTRUSION ON A CHIP SURFACE

This application is a continuation of application Ser. No. 08/539,374, filed Oct. 5, 1995, now abandoned.

This application is a Continuation of International Application No. PCT/SE94/00290 filed Mar. 30, 1994, designating the United States.

BACKGROUND OF THE INVENTION

The present invention relates to a cutting insert for chip-breaking machining having a polygonal basic form and comprising at least one cutting edge along the periphery of the insert and at least an adjacent operative cutting corner.

A multitude of known inserts have chip formers which consist of a plurality of ridges along the cutting edges. Further, in for instance U.S. Pat. No. 4,988,242 cutting inserts are disclosed which comprise recesses arranged adjacent to each other in the chip surface, which recesses create ridges between each other. These ridges are perpendicular relative to the respective cutting edge, and the distance between two adjacent ridges is not constant from one recess to the next; rather that distance diminishes in a direction towards the middle of the cutting edge. Thus, the contact area between chip and ridge is greatest near the middle of the cutting edge which shall cause the chip to be led away from the surface of the work-piece in order not to damage it. However, this desired effect has turned out to be insufficient in some applications. Particularly, for out- and in-copying operations and for facing operations, often long chips with a large radius of curvature arise, which may scratch and damage the produced surface. Further, the contact surface between chip and chip surface becomes considerable in the case of large cutting depths, which leads to an increased heat transfer to the cutting insert and, thus, to a shorter life. Moreover, no satisfactory chip control has been attained in the case of small cutting depths, where in principle only the cutting corner is in chip engagement, particularly at high feeds.

Thus, a first object of the present invention is to provide a cutting insert which steers the chip flow away from the machined surface, in particular for turning at in- and out-copying and at facing.

A further object of the present invention is to achieve a good chip control at small cutting depths and large feeds.

Another object of the present invention is to reduce the heat transfer to the insert and, thus, to increase its life.

Still another object of the present invention is to provide a "universal" turning insert, which gives a good chip control at low, medium and high feeds by a polyvalent chip-breaking geometry, in combination with both a small, a medium and a large cutting depth.

SUMMARY OF THE INVENTION

These and further objects have been attained in a surprising way by forming each operative cutting corner with a banana-like or C-formed protrusion. It should be pointed out that by "banana-like" or "C-formed" is intended a protrusion which is continuously curved, by one or more radii, but also a more "boomerang-like" protrusion, the two legs of the "boomerang" being equally long.

BRIEF DESCRIPTION OF THE DRAWINGS

For illustrative but non-limiting purposes, the invention will now be further described in connection with the appended drawings. In these are.

DETAILED DESCRIPTION OF PREFERRED EMBODIMENTS OF THE INVENTION

The cutting insert according to the figures is generally designated by 10. It comprises an upper surface, and a lower surface which is substantially parallel to the upper surface, and four substantially similar side surfaces 1 interconnecting those two surfaces. Further, the insert has a polygonal basic shape, in this case a rhombic basic form. It is made of a hard material, such as cemented carbide, a ceramic or bore nitride.

Figure 4:
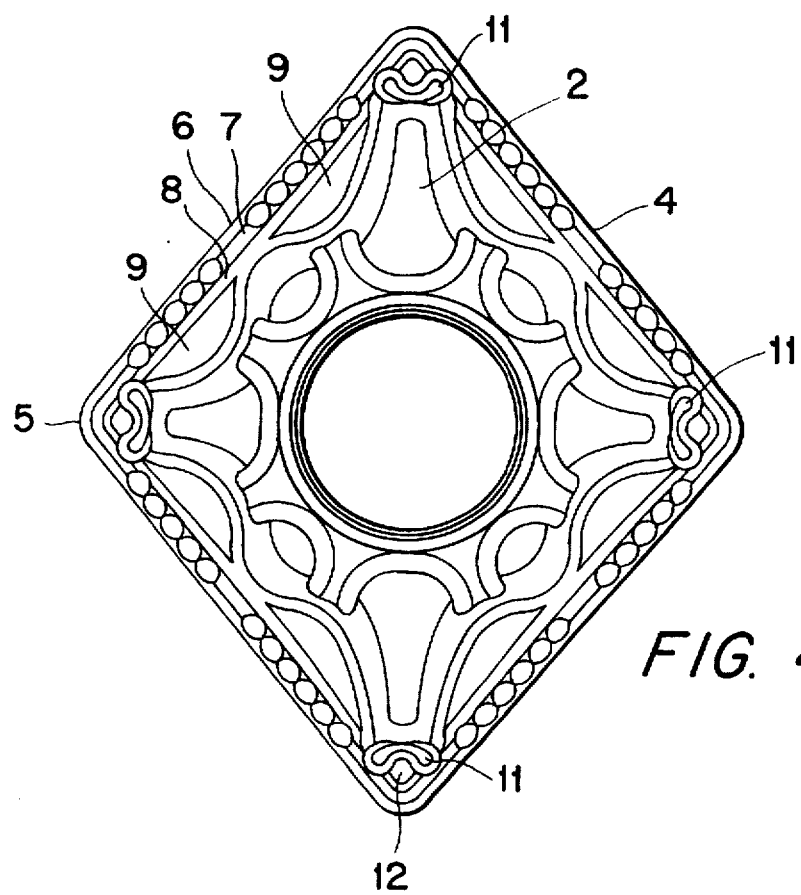
FIG. 4 a top view of the cutting insert according to FIG. 1.
Figure 5:
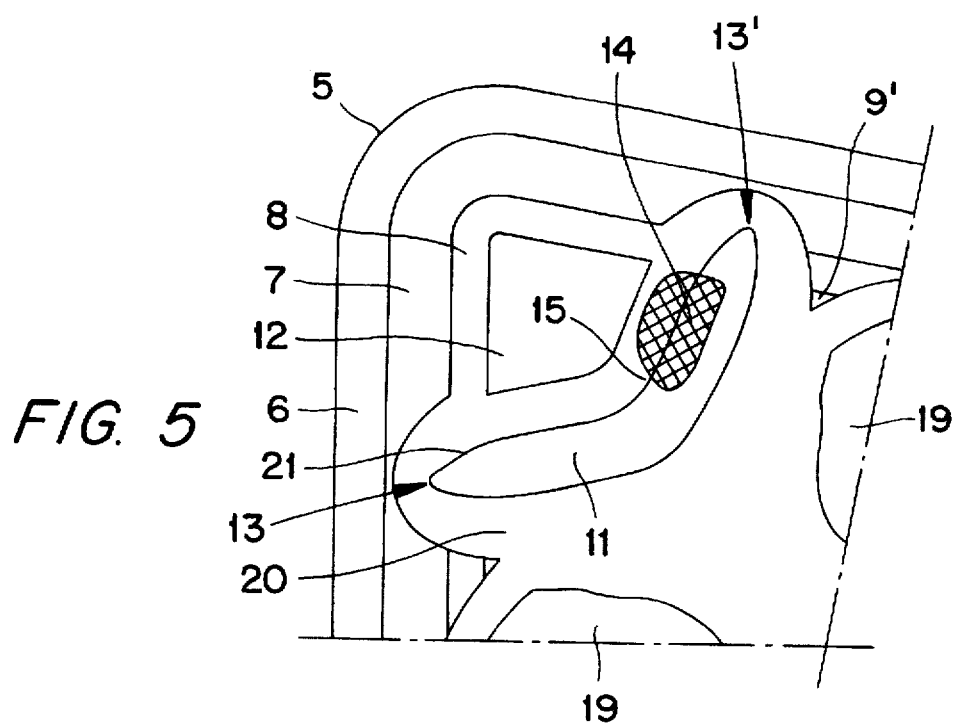
FIG. 5 a top view of a cutting corner of a single-sided insert according to the invention.
Figure 6:
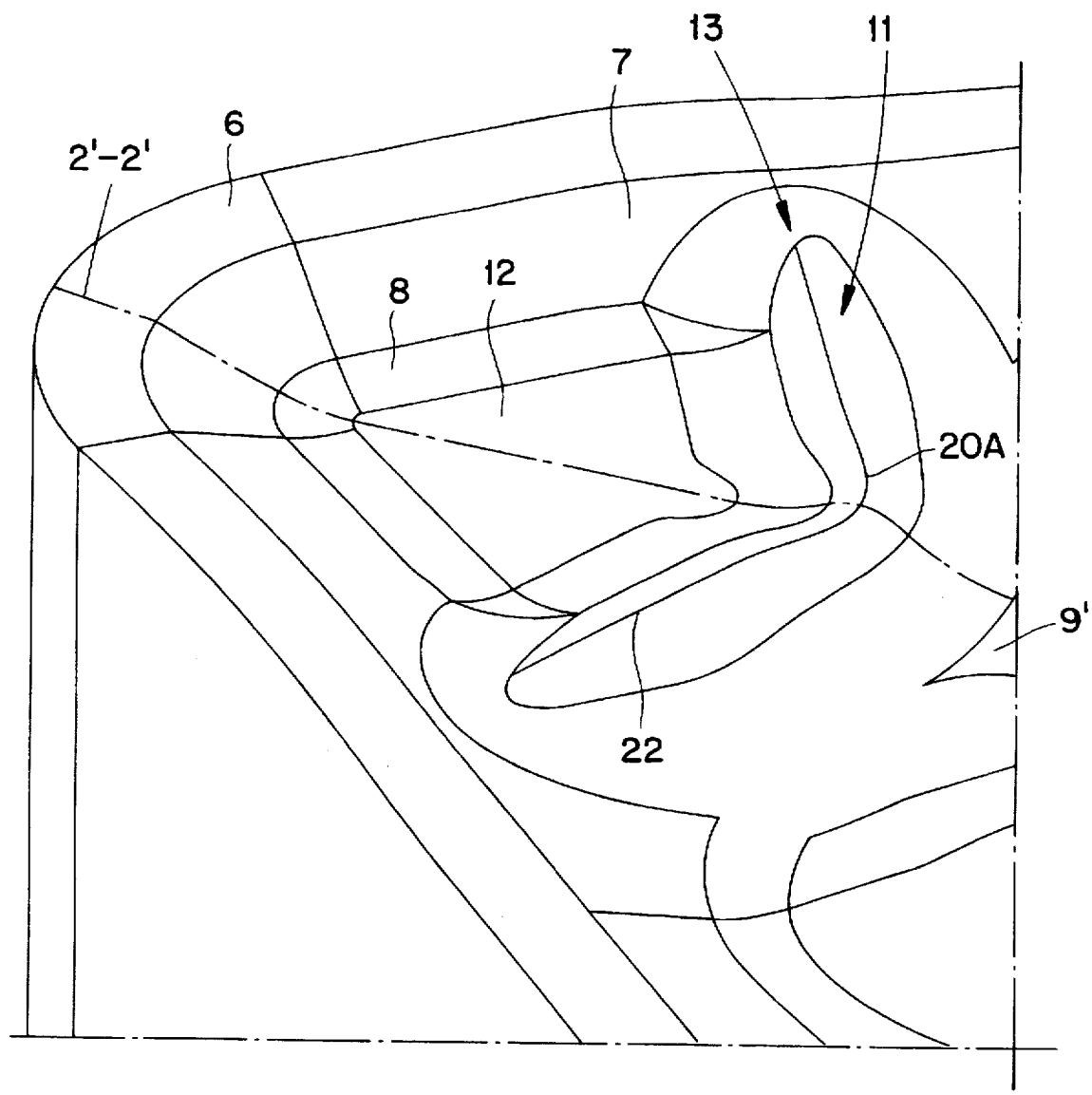
FIG. 6 an enlargement of a cutting corner of a single-sided insert according to the invention in a perspective view.

The cutting insert may be double-sided in accordance with FIGS. 1 to 4, or single-sided in accordance with FIGS. 5 and 6.

On double-sided inserts, the upper and lower surfaces are substantially identical. Since in this case each chip surface also has to function as a support surface, the two sides are formed with seating surfaces 2. On the one hand, these seating surfaces should be located as close to an operative cutting corner as possible in order to minimize the overhang and, thereby, the risk of a rupture of the insert, and on the other hand sufficient space must be at hand for accommodating the chip-forming geometry according to the invention. A good compromise has turned out to be that the distance between the seating surface and cutting corner does not exceed 3.5 mm, preferably 2.5 mm.

Side surfaces 1 and the chip surface meet along edge lines which form main cutting edges 4. These can be wholly straight or they may for instance have a concave shape lying within a vertical plane which contains the side surface 1. The rounded corners 3 adjoin the chip surface along rounded corner cutting edges 5. Along the whole periphery of the chip surface runs an edge-reinforcing land or primary face 6. Immediately inside this land there extends a downwardly sloping chip surface 7, which transposes into a substantially horizontal land 9 via a radius surface 8.

An essential feature of the present invention is that in each corner on the chip surface there is a banana-like, boomerang-like or C-like protrusion 11, whose concave side 15 is directed towards the corner. Between this protrusion and the corner, there are disposed the parts 6, 7 and 8, as well as a substantially horizontal surface part 12, which preferably is on a somewhat higher level than land 9, suitably between 0 and 0.25 mm higher. Surface part 12 lies in a plane oriented perpendicular to a center axis A of the insert (see FIG. 2).

On double-sided inserts the central part 11A of the convex side 20 of the protrusion 11, which side 20 faces towards the center of the cutting insert, immediately connects to a seating surface 2. However, this direct transposition from the protrusion 11 to the seating surface 2, without any intermediate lower portion, should amount to maximally a third, preferably a fifth, of the total length of the protrusion, inter alia in order to not unnecessarily enhance the heat transfer to seating surface 2 and to avoid obstructing the chip flow at larger cutting depths.

However, on single-sided cutting inserts the banana- or C-like protrusion 11 may be entirely detached, i.e. spaced, with respect to the seating surface, as may be seen in FIGS. 5 and 6.

The basic curved configuration of the protrusion 11 shall include (i) the inwardly curved side or surface 15 facing towards the cutting corner, which surface 15 stands up from the horizontal reference plane of the surface part 12, (ii) two end portions 13, 13', and (iii) a sloping convex surface portion 20 (in two parts in FIGS. 1–4) facing in a direction away from the cutting corner. Thanks to this configuration, a double-function is performed by the protrusion 11, namely:

a) At small cutting depths, such as less than 2 mm, the chip comes into contact with a rear portion of the protrusion 11, as seen in the direction of cutting, i.e., into contact with a portion 14 of the surface 20 (see also FIG. 5), thereby contributing to a curving and a breaking of the chip and giving a perfectly satisfactory chip control. The formed chips do not come into contact with the surface of the work-piece but are curved and deviate towards the rear, non-operative main cutting edge and side surface.

b) At larger cutting depths, in particular when the width of the chip exceeds the double distance between the surface being formed on the work-piece and the end portion 13 of the protrusion, the chip will mainly come into contact with the front end portion 13 (or 13') of the protrusion, as seen in the direction of cutting, and becomes curved, and possibly also broken, when bearing against that end portion. Thus, also in this case the protrusion carries the chip away from the work-piece.

The height of protrusion 11 relative to the reference plane of surface 12 should not be less than 0.02 mm in order to at all attain the desired chip forming effects. On the other hand, the height of the protrusion 11 (i.e., the highest point of the protrusion) should not exceed 0.5 mm above the corner cutting edge, in order to not unnecessarily increase the cutting forces. Preferably, the height of the protrusion does not exceed the height of the corner cutting edge at the corner bisector. More precisely, the highest point of the protrusion should be between 0 and 0.4 mm, preferably between 0 and 0.2 mm, below the intersection between the corner edge and the bisector 2—2 of the corner. The average radius of curvature of the concave side of the protrusion should not be less than a fourth of the corner radius, i.e., the radius of the corner cutting edge. The upper limit of the length of that corner radius of curvature of the protrusion is suitably 10 mm, preferably 7 mm and in particular 5 mm. Of course, this limit is also dependent upon the size of the cutting insert and the size of the corner radius of the insert. In some applications, average radii of curvature as small as 0.2 mm have been used.

The position of protrusion 11 in relation to the corner radius may vary along the cross-section of the bisector from the center of the corner radius to about four times the corner radius, measured from the intersection of the corner cutting edge with the corner bisector 2—2. The protrusion 11 extends substantially symmetrically in both directions, from the corner bisector 2—2.

In FIG. 6 one can see the detailed shape of the protrusion 11 in accordance with another preferred embodiment, according to which the protrusion has a more boomerang-like configuration. The bisector is designated 2'—2' and the ridge line of the protrusion is designated 22. In order to facilitate the chip flow at larger cutting depths, the end portion 13 of the protrusion overlaps with chip surface 7, the substantially plane surface 12 being clearly delimited all around. Surface 12 is situated between 0 to 0.25 mm above surface 9'. Further, in its central part, protrusion 11 may have a depression 20A with the aim of not obstructing the chip flow. Suitably, this depression 20A may be between 0.05 and 0.2 mm lower than the highest points of the protrusion. However, it should be pointed out again that preferably no point of the protrusion 11 is higher than the corner cutting edge. In order to make possible a longer projection of the protrusion relative to the direction of the chip flow at small cutting depths, the protrusion may have a bend at the intersection with bisector 2'—2', whereby the protrusion gets a more "boomerang-like appearance. The protrusion has a rounded profile along the whole ridge 22, which minimizes the contact surface, and thereby also the friction forces and the heat transfer from the chips to the insert.

In connection with wider chips, protrusion 11 may cooperate with substantially spherically concave recesses 16 (see FIG. 1) known per se, which are arranged adjacent to each other, behind the respective main cutting edge. Thereby ridges 17 are formed between recesses 16, which ridges contribute to a lower heat transfer to the cutting insert and a steering of the chips away from the work-piece.

Figure 1:
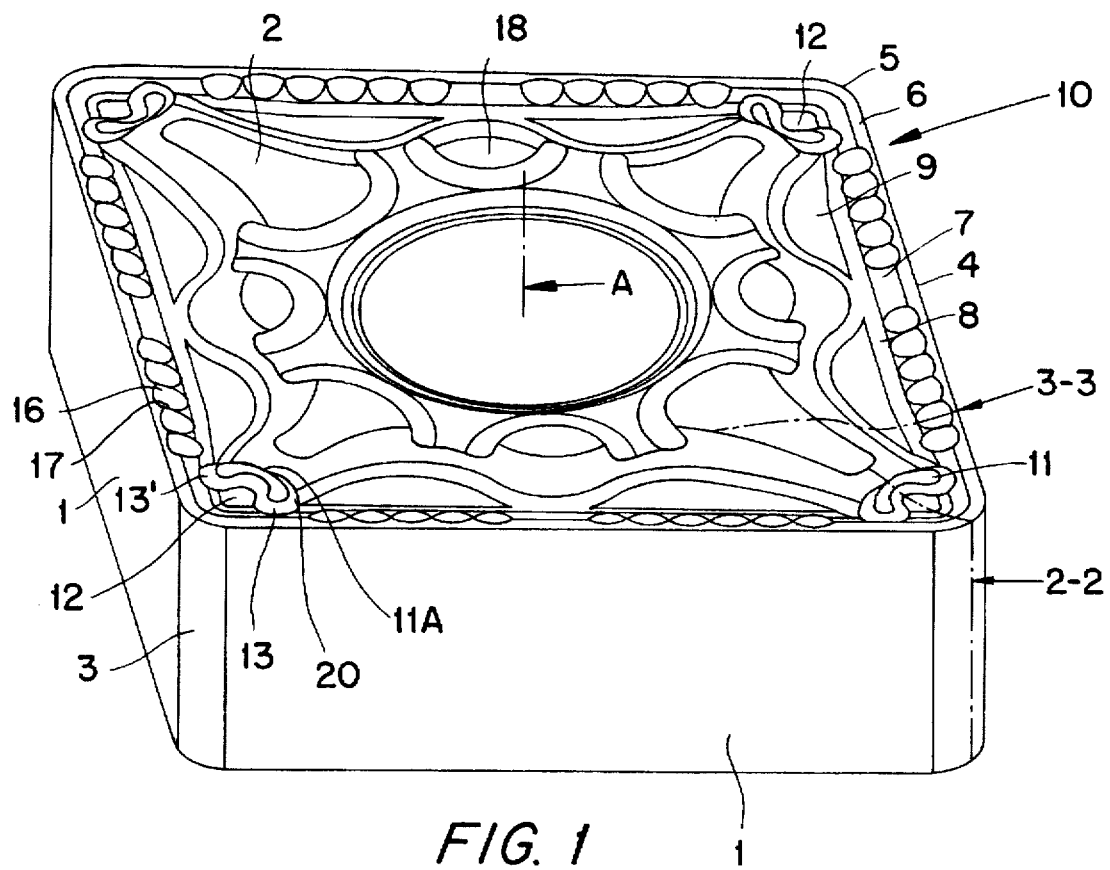
FIG. 1 a double-sided cutting insert according to the invention in a perspective view.
Figure 2:
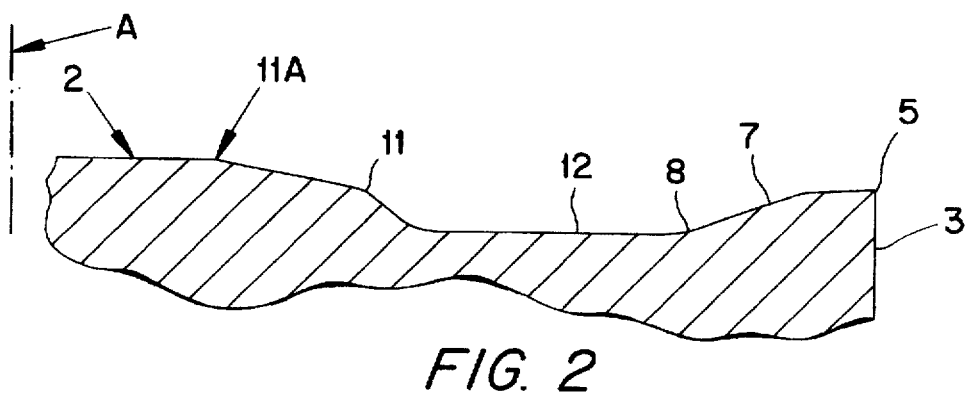
FIG. 2 a vertical cross-section of the insert according to FIG. 1 taken along the bisector plane 2—2.
Figure 3:
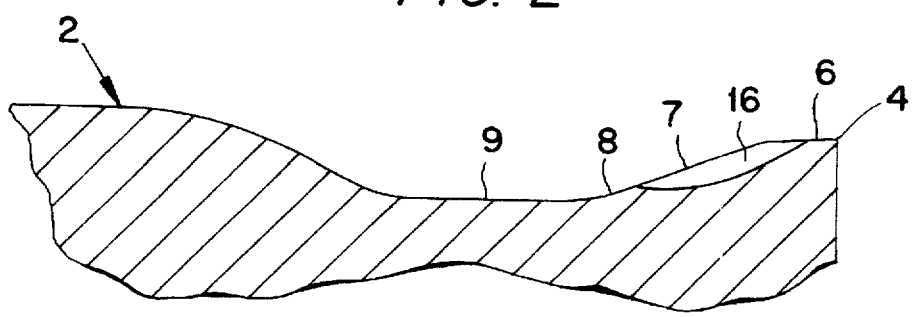
FIG. 3 a vertical cross-section of the cutting insert according to FIG. 1 taken along the plane 3—3.

The portions of the geometrical configuration of the chip surface illustrated in FIGS. 1 and 4 which have not been discussed up to now, are not essential for the present invention and may be varied within wide ranges. Thus, a single-sided insert may for instance be made completely planar, with the exception of the protrusions 11, since no seating surfaces such as surfaces 2 and 18 are then required. Further, recesses 16 may be dispensed with, in particular if the insert is intended for being used for small cutting depths.

FIG. 5 shows an operative cutting corner of a single-sided cutting insert. This has a considerably simplified geometry in comparison with the double-sided insert according to FIGS. 1–4, but it still has the protrusion 11 which is essential for the invention. Moreover, also this insert is formed with an edge-reinforcing land or primary face 6, which connects to an essentially horizontal area 9' via a substantially planar chip surface 7 and a radius 8, as shown in the figure. The ends of protrusion 11 overlaps with said radius, and also with chip surface 7. The inversion line between the concave and convex radii of the protrusion is designated 21. Moreover, the cutting insert is provided with bumps 19 which function as chip breakers at larger cutting depths in a way known per se.

For cutting economy reasons, at least two corners should preferably be formed as operative cutting corners, comprising the elongate protrusion according to the present invention. However, within the scope of the present invention also cutting inserts with only one operative cutting corner are conceivable.

Also other polygonal basic shapes are possible, for both single- and double-sided indexable inserts. Thus, the invention also contemplates for instance square, triangular and rectangular cutting inserts.

The angle between the lower surface and the side surfaces 1 is suitably between 90° and 110°, preferably between 90° and 100°.

Suitably, the inserts are produced with a through center hole for the fastening of the insert in the insert pocket by a suitable screw, locking pin or similar.

Although the invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting insert for chipbreaking metal machining, comprising upper and lower substantially parallel surfaces, at least one of said upper and lower surfaces constituting a chip surface; a center axis of the insert intersecting said upper and lower surfaces; at least three side surfaces intersecting said upper and lower surfaces; adjacent ones of said side surfaces intersecting one another at a rounded corner; said side surfaces intersecting said chip surface to define main cutting edges therewith, and said corners intersecting said chip surface to define corner cutting edges therewith; protrusions disposed on said chip surface adjacent respective ones of said corners; each said protrusion being of curved configuration with a concave side facing a respective corner and a convex side facing away from said respective corner; said chip surface including a reinforcing land disposed immediately inwardly of said main cutting edges and said corner cutting edges; each protrusion extending no higher than a point of intersection of a respective cutting corner edge and a bisector of that corner; said chip surface including a planar surface disposed between a respective corner cutting edge and a respective protrusion, both said respective cutting edge and said respective protrusion extending higher than a highest point of said planar surface; there being a sloping surface sloping downwardly from the reinforcing land in a direction away from the cutting edge and transforming into a radiused surface which transforms into the planar surface, the planar surface extending to the protrusion and lying in a plane oriented substantially perpendicular to the center axis of the insert, the protrusion extending higher than all portions of the planar surface by at least 0.02 mm.

2. The cutting insert according to claim 1, wherein said lower surface also constitutes a chip surface and includes said protrusions.

* * * * *

UNITED STATES PATENT AND TRADEMARK OFFICE
CERTIFICATE OF CORRECTION

PATENT NO.   : 5,743,681

DATED        : April 28, 1998

INVENTOR(S)  : Wiman et al.

It is certified that error appears in the above-identified patent and that said Letters Patent is hereby corrected as shown below:

On the title page, insert item -- [30] Foreign Application Priority Data
April 5, 1993 [SE] .....................9301132-8 --

Signed and Sealed this

Eighteenth Day of May, 1999

*Attest:*

*Attesting Officer*

Q. TODD DICKINSON

*Acting Commissioner of Patents and Trademarks*